United States Patent

Soehring et al.

[11] 3,829,206
[45] Aug. 13, 1974

[54] FILM PROJECTOR, ESPECIALLY FOR TEACHING MACHINES

[76] Inventors: Gerhard Soehring, 26 Unterer Burggarten, 6901 Dossenheim; Manfred Moessner, 14 Hebelstrasse, 6901 Eppelheim; Gerhard Kreutze, 2 Beethovenstrasse, 6901 Bammental; Guenther Obstfelder, 26 Im Enkler, 6906 Leimen, all of Germany

[22] Filed: Mar. 7, 1973

[21] Appl. No.: 338,950

[52] U.S. Cl. ................................ 352/160, 352/92
[51] Int. Cl. ............................................ G03b 21/46
[58] Field of Search .................... 352/160, 162, 92

[56] References Cited
UNITED STATES PATENTS
1,165,147   12/1915   Wells .................................. 352/162
1,286,483   12/1918   Ziegler ............................... 352/160
2,563,892   8/1951    Waller ............................. 352/92 X
2,901,940   9/1959    Kuhnert ............................ 352/160

Primary Examiner—Monroe H. Hayes
Attorney, Agent, or Firm—Johnston, Keil, Thompson & Shurtleff

[57] ABSTRACT

A film projector, especially for teaching machines, which can be operated with a film provided with control marks. The control marks are associated with frames on the film and are preferably provided at the beginning of the film. When the film is running or a static image is being reproduced, vertical adjustment of the image can be effected reliably by hand or automatically by motor means to compensate for tolerances in the position of the perforations, and/or in the film transport. Film projectors of this type can be employed particularly advantageously in all cases where re-copied films are used and/or the film is transported by means of a claw.

4 Claims, 4 Drawing Figures

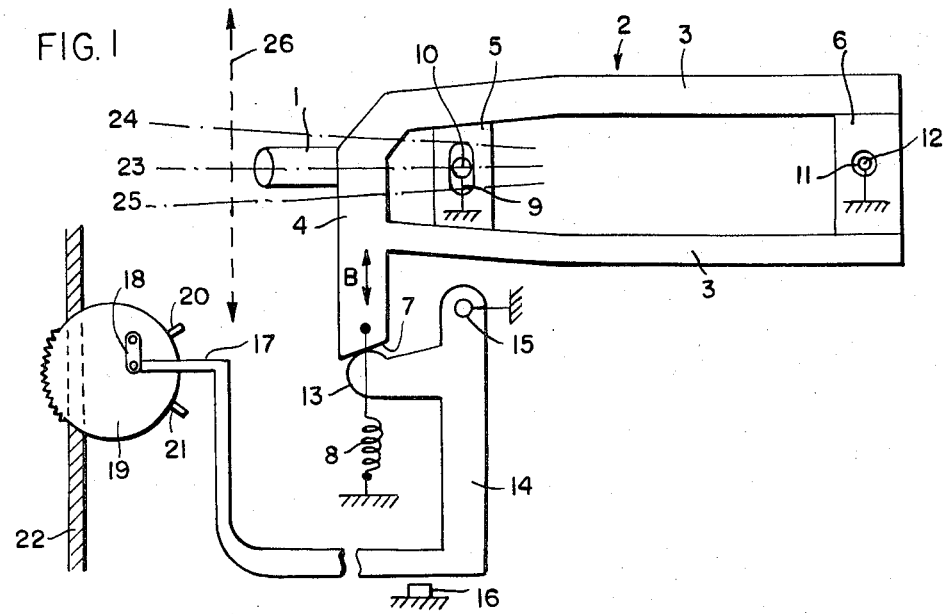
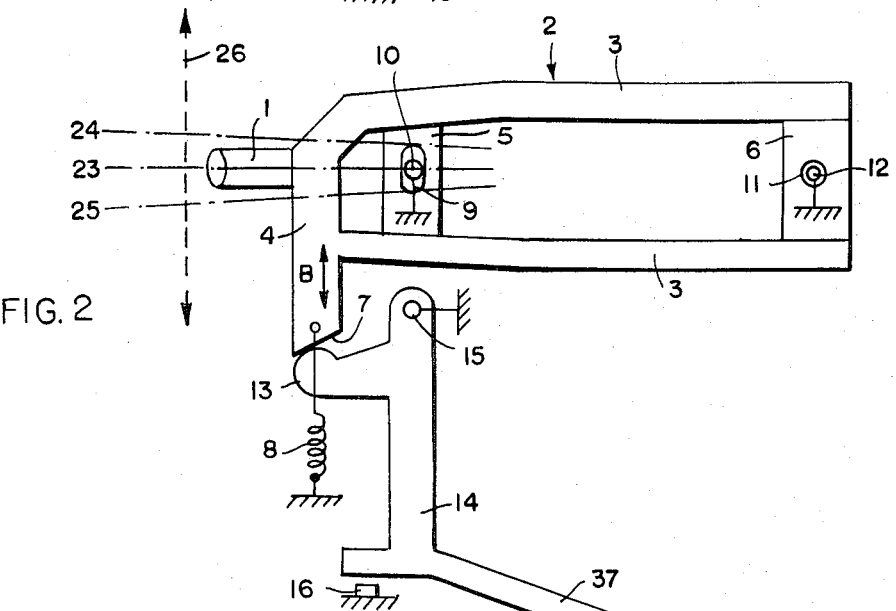
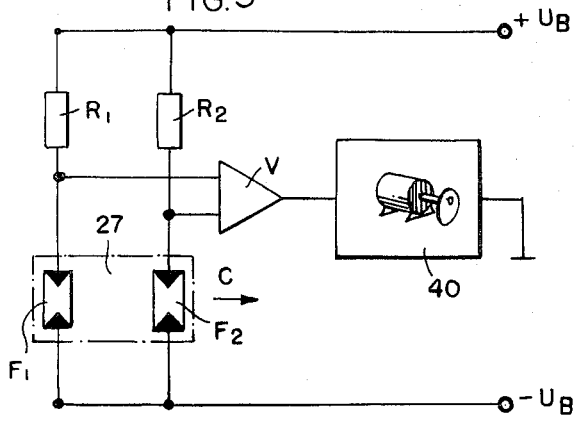
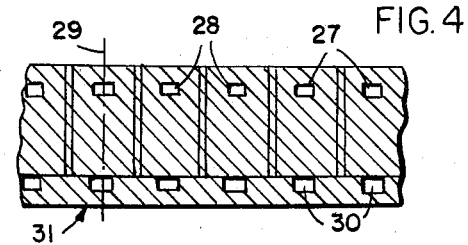

FILM PROJECTOR, ESPECIALLY FOR TEACHING MACHINES

The invention relates to a film projector, especially for teaching machines, which is operated with a film provided with control marks, control signals which actuate an adjusting device being produced by means of the marks and sensing elements associated therewith.

In film projectors, a device for the vertical adjustment of the image is necessary because the distance between the upper or lower edge of the frame and the perforation associated therewith can vary from film to film; these tolerances can originate either from the camera used for taking the film or from the process of re-copying the film onto a film of different size. Such a device may also be necessary if the film is transported by means of a claw, there being inevitable a shift in the image with respect to forward and reverse motion because in the forward direction the claw comes into contact with the lower edge of the perforations and in the reverse direction it comes into contact with their upper edge.

Devices by means of which the claw is shifted vertically relative to the film platform, so that a corresponding vertical displacement of the film relative to the film platform results, are known which compensate for the abovementioned tolerances. However, this displacement is only possible with a moving film, i.e. it is not possible to effect vertical adjustment of the image when reproducing a static image.

Furthermore, film projectors for reproducing a static image are known but these are not usually equipped with devices for the vertical adjustment of the static image. In the case of movable film projectors, the latter can be moved relative to a fixed screen so that vertical adjustment of the image can be achieved. If, however, the film projector is not movable relative to a fixed screen vertical adjustment of a static image cannot be effected by known methods.

Teaching machines should be so designed that they are as simple as possible to operate in order to distract the student as little as possible.

This requirement has not been taken into account in teaching devices hitherto known, especially with regard to vertical adjustment of the image. German Pat. No. 1,200,029 discloses a teaching machine consisting essentially of a film projector. The educational film for use therewith so provided with programme-related light and dark areas in a chequered pattern. When the machine is in operation, depending on the content of the image or images presented and on the keys selected by the student, the light passing through the light areas is converted, by means of photoelectric resistors, into control signals for the film transport device. As a consequence, the film is transported forward or backward by one or more frames. However, no provision whatsoever is made for vertical adjustment of the image relative to the screen in this conventional teaching machine. Automatic vertical adjustment of the image is not known for conventional film projectors either.

It is an object of the present invention to provide a film projector having a relatively simple device which is suitable for the vertical adjustment of a moving image and a static image and which is able to compensate for tolerances in the position of the film perforations and/or in the film transport when the film is run forward or backward.

This object is achieved according to the invention with a film projector, especially for teaching machines having a housing and an optical system for projecting an image, the optical system including at least one lens mounted on a carrier movable relative to the housing in directions in and opposite to the direction of film travel through the projector and a device adapted to adjust the position of the lens carrier in said directions for the purpose of effecting vertical adjustment of the image.

Perfect positioning of the image is thus achieved according to the invention with simple means regardless of how large the tolerances in the position of the film perforations or in the film transport are and regardless of the transport system used in the film projector. In an advantageous embodiment of the film for a projector according to the invention the marks are located inside the frame. The position of the marks is thus fixed relative to the periphery of the frame. The marks can in principle be in the form of optical or magnetic designations.

In a further advantageous embodiment, the marks on the film are in the form of light-transmitting windows. The marks can thus, for example, be included in the frames in a simple manner when the film is shot, or be punched out, as openings, beforehand or afterwards.

In yet another advantageous embodiment of the invention two fixed photoelectric components, as sensing elements, located symmetrically with respect to the transverse central axis of the frames in the direction of motion of the film are associated with the row of marks.

The marks and the photoelectric components located behind them are inevitable illuminated by the projection lamp of the projector, and the symmetrical arrangement of the components enables a differential photoelectric current to be produced which can be used for control purposes.

According to the invention, a projector with an objective mounted on an objective carrier can advantageously be so designed that the objective carrier can be moved in the direction of travel of the film with the aid of a movably arranged adjusting device. This design provides a simple and reliable device for the vertical adjustment of the image which can be used even if a static image is being reproduced and is at the same time controllable so that exact vertical adjustment of the image on the screen can be achieved at any time.

In a further advantageous embodiment, the objective carrier is tiltable about a pivot which is as far away as possible from the objective. It is thus possible to achieve, by simple mechanical means, a practically distortion-free image even though the objective moves in an arcuate path.

In a further advantageous embodiment of the device according to the invention. the adjusting device comprises a pivotally mounted lever and a manually operated member connected thereto. The lever and member are simple to manufacture and reliable in operation, so that extremely accurate manual adjustment is possible.

In a further embodiment, at least part of the member projects outside the projector housing for easy operation.

A further simple and reliable adjusting device according to the invention comprises levers and an actuating motor, by means of which the vertical position of the objective can be varied very accurately.

In a further embodiment of the invention for a film projector employing a claw transport system it is also possible to use, as actuating drive, an electric motor by means of which the vertical position of the claw can be varied.

Further details of the invention are disclosed in the following description of one embodiment thereof illustrated in the accompanying drawings, in which FIG. 1 shows an objective carrier which can be tilted with a manually operated device, FIG. 2 shows an objective carrier which can be tilted with the aid of an actuating motor.

FIG. 3 shows a circuit arrangement of the actuating motor and the sensing elements, and their spatial relationship relative to a window mark, and FIG. 4 shows an initial section of a film provided with control marks.

An objective 1 of a film projector is rigidly mounted on a carrier 2 comprising, for example, two members 3 with struts 4 – 6. Strut 4 which carries the objective 1 has a downward extension with a lower chamfered edge 7. Strut 4 is pulled toward the projector housing by means of a tension spring 8. Strut 5 is provided with a vertical slot 9 which cooperates with fixed pin 10 on the housing. The rear strut 6 has a central bore 11 through which a further pin 12 on the housing enters. The bore 11 and the pin 12 form the pivot of the carrier 2; this pivot should be as far away as possible from the objective 1 so that its tilting movement takes place approximately rectilinearly. The ends of the slot 9 in conjunction with pin 10 serve as upper and lower stops for the carrier 2 when it is tilted. The round end 13 of an arm on lever 14, which is shown incompletely, bears against the chamfered edge 7 of strut 4. This lever 14 is mounted so that it can pivot about a fixed pin 15 on the housing. Movement of lever 14 in an upward direction is limited by the lower end of slot 9 and in a downward direction by fixed stop 16.

A projection 17, which is movably attached to an eccentric rod 18 on a knurled wheel 19, is provided at the free end of the lever 14. Stop pins 20 and 21 prevent the continuous rotation of the knurled wheel 19. The knurled wheel 19 partially projects through wall 22 of the housing and is rotatably mounted thereon. This arrangement enables the adjusting device to be operated by hand without difficulty from the outside. Depending on the direction of rotation of the knurled wheel 19, the objective 1 moves through a certain angle upwards or downwards in an arcuate path determined by the distance of the pivot from the objective 1. When the objective 1 and the carrier 2 are in their central position, axis 23 runs through the middle of pin 12 and objective 1. The end positions of carrier 2 and hence of objective 1 are indicated by broken lines 24 and 25. The direction of motion of the film is indicated by double arrow 26 in front of the objective 1. In principle, the carrier can be tilted at any angle. However, in order to keep distortions as small as possible, and because in most cases only slight tolerances in the position of the film perforations have to be compensated for, a vertical adjustment of about plus or minus one-eighth of the height of the image (about 0.9 mm for 16 mm film) at the objective 1 normally suffices. Vertical adjustment is infinitely variable up to a maximum imposed by the said stops. The direction of movement of the carrier 2 and hence of the objective 1 is indicated by double arrow B.

In order to eliminate any distortions resulting from the arcuate path of the objective, it is of course also possible to move the objective carrier 2 parallel to the direction of motion of the film, by suitable means.

The above-described device for effecting vertical adjustment of the image is particularly suitable for film projectors which are also able to project a static image, particularly teaching machines. It is thus possible to effect vertical adjustment of the image extremely accurately with one manipulation at the start of the lesson so that there is no need for the teaching session to be disturbed by subsequent readjustment.

The device described above can be converted, with slight changes, from manual to automatic operation.

In FIG. 2, arm 37 having an actuating member 38 is provided, for this purpose, at the free end of lever 14. Member 38 is at an angle to arm 37 and constantly bears against the cam 39 on a DC motor 40 which serves as actuating drive. The position of cam 39, relative to member 38, which is shown in the drawing corresponds to the depicted central position of the objective 1. If the cam 39 is turned in the direction of double arrow A, the lever 14 is actuated and hence the carrier 2 and the objective 1 are moved in the direction indicated by double arrow B. The objective moves upwards or downwards through a certain angle in an arcuate path determined by the distance of the pivot 11, 12 from the objective. The motor 40 is provided with reduction gear and rotates approximately at a speed of 1 revolution per second. As a result of the shape of the cam 39 the adjusting operation is over after not more than half a revolution. Motor 40 can be coupled to carrier 2 using other suitable means.

The circuit arrangement in FIG. 3 consists essentially of two parallel branches inserted between the leads $+U_B$ and $-U_B$, each of which branches comprises a series resistor $R_1$, $R_2$ and a photoelectric resistor $F_1$, $F_2$. The inputs of an amplifier V are connected between $R_1$ and $F_1$ and between $R_2$ and $F_2$ respectively. The output lead of amplifier V is connected to motor 40 which is grounded on the other side.

A rectangular window 27 is shown in broken lines above the photoelectric resistors $F_1$ and $F_2$ which can be located parallel above one another, in the direction of film motion indicated by arrow C, at a suitable position on the projector chassis or can be mounted at the side of the screen if a ground glass screen is used. The window 27 represents one of the marks and can be in the form of a hole or a light-transmitting rectangle. As can be seen from FIG. 4, the window is located inside frame 28 on the transverse central axis near the edge of the frame opposite perforation 30. It is also possible to provide other marks, for example magnetic strips and the like, on the film. Even when one or more optical marks of suitable shape are used, it is necessary to fix their position relative to the periphery of the frame so that a spatial relationship relative to the frame results. In principle, it is also possible to provide the marks between successive frames or on the edges of the film. The photoelectric resistors can be replaced by any other photoelectric components such as phototransistors and photoelements.

The photoelectric resistors are located in a projection plane at a distance from one another which corresponds to the projected length of the window 27 when viewed in the direction of film travel. Thus, in the ideal case where the tolerances in the position of the perforations and in the film transport are zero, each photoelectric resistor is illuminated to the same extent by the projector lamp, which is not shown, so that currents of the same magnitude flow in both branches and there is no current difference at the input of the amplifier, so that the motor 40 is not actuated. If, however, the position of the window 27 is not symmetrical with respect to the photoelectric resistors, due to tolerances in the position of the perforation and/or in the film transport, currents of different magnitude are produced in the corresponding branches and a current difference is produced at the input of the amplifier V. This difference, when amplified, actuates the motor 40 which rotates in one of the directions (arrow A) so that the objective 1 is tilted to the necessary extent and the frames are again presented at the correct height on a screen which is not shown. When the latter state is reached, each photoelectric resistor is again illuminated to the same extent so that the adjusting operation ended. If tolerances in the position of the perforations which cause a vertical displacement of the window or windows 27 occur again, the adjusting operation can be of any desired duration. In practice, a time of about 1 to 2 seconds has proved suitable; this suffices to compensate for the said tolerances.

FIG. 4 shows an initial section of a film 31 with frames 28, perforations 30 and marking windows 27. The hatching is intended to indicate that the beginning of the film is black except for the windows 27 and the perforations 30, so that a good contrast is obtained. However, in practice it is not necessary to do without images at the beginning of the film. For example, the windows 27 can, as mentioned above, also be located within a black edge of the film or even between the perforations 30. It is furthermore also possible to provide windows 27 only in every second or third frame 28 and not in every frame. However, in order to keep the loss of information carried by the film to a minimum, it is advisable to provide only about 40 consecutive frames at the beginning of the film with windows so that the adjusting operation is over in not more than 2 seconds. In principle it is, however, also possible to provide the marks over the entire length of film advantageously at the perforation edge.

The adjusting device can be switched off after the length of film determined by the control marks has run through. In the case of educational films, switching-off can also be effected by special code marks and appropriate sensing devices. Other suitable switching-off measures are also conceivable. Of course, the control circuit can also reamin in operation during projection of the entire film, so that automatic vertical adjustment of the image takes place constantly; this would be advisable particularly in the case of films which have been re-copied badly or in the case of projectors on which the film is frequently rewound and use a claw transport system. Other designs of film projectors with automatic devices for the vertical adjustment of the image are also conceivable. The design described above has proved to be reliable under field operating conditions in spite of its relative simplicity. Such an adjusting device can be used advantageously for teaching machine projectors and for any other type of film projector — if desired, it can be installed subsequently — since operation of such equipment is made much easier.

We claim:

1. In a film projector having a housing, an optical system for projecting an image, the optical system including at least one lens mounted on a carrier movable relative to the housing in directions in and opposite to the direction of travel of a film through the projector, and a device adapted to adjust the position of the lens carrier in said directions for the purpose of effecting vertical adjustment of the image on a screen, the improvement comprising:

means for pivotally mounting said lens carrier, including a pivot means provided in a location on the carrier which is spaced a substantial distance behind the lens and means located on the carrier near the lens for limiting the range of vertical movement of the lens carrier, the distance of said pivot means from the lens and the range of vertical movement determined by said limiting means being such that an approximately rectilinear movement of the lens is obtained during adjusting operation thereof, and means for adjusting said pivotally mounted lens carrier, said adjusting means including a tiltably mounted lever engaging a portion of said lens carrier during said adjusting operation, said portion being located adjacent the lens.

2. In a film projector the improvement as claimed in claim 1, wherein said limiting means are designed to limit the vertical movement of the lens to range of about plus or minus one eighth of the height of one of the frames on the film.

3. In a film projector the improvement as claimed in claim 1, wherein said lens carrier is formed as a frame means comprising two substantially parallel struts, said parallel struts being connected by at least three transverse struts, a first of said transverse struts being located adjacent the lens for engaging said tiltably mounted lever of said adjusting means, a second transverse strut being located near the lens and a third strut being provided at said spaced location, said limiting means including a slot in said second transverse strut extending in the direction of film travel and said pivot means including a bore in said third transverse strut, said slot and said bore being engageable by, and cooperating with, relatively stationary means carried by the housing.

4. In a film projector as claimed in claim 1 for use in a teaching machine, and in which the film is provided with control marks thereon, said marks, in a manner per se, being scanned by sensing elements which produce control signals by means of which the adjusting device is actuated for vertical adjustment of the image on a screen to compensate for tolerances in the position of the perforations and/or in the film transport during film travel, wherein each control mark is provided on the transverse central axis of a frame on the film and wherein at least two sensing elements are provided for the control marks on the film, said sensing elements being located symmetrically with respect to the transverse central axis of the frames in the direction of film travel.

* * * * *

UNITED STATES PATENT OFFICE
CERTIFICATE OF CORRECTION

Patent No. 3,829,206            Dated  August 13, 1974

Inventor(s) Gerhard Soehring, M. Moessner, G. Kreutze, G. Obstfelder

It is certified that error appears in the above-identified patent and that said Letters Patent are hereby corrected as shown below:

In the heading insert --[30] Foreign Application Priority Data, March 8, 1972, Germany G 72 08 770.8; and January 27, 1973, Germany P 23 04 110.3--.

Signed and Sealed this sixteenth Day of September 1975

[SEAL]

Attest:

RUTH C. MASON
Attesting Officer

C. MARSHALL DANN
Commissioner of Patents and Trademarks